United States Patent [19]

Bittner et al.

[11] Patent Number: 4,758,964
[45] Date of Patent: Jul. 19, 1988

[54] METHOD AND APPARATUS FOR MONITORING MACHINE PARTS

[75] Inventors: Gerd Bittner, Bottrop; Gholam-Reza Sinambari, Velbert, both of Fed. Rep. of Germany

[73] Assignee: Fried. Krupp Gesellschaft mit beschränkter Haftung, Essen, Fed. Rep. of Germany

[21] Appl. No.: 856,167

[22] Filed: Apr. 25, 1986

[30] Foreign Application Priority Data

Apr. 26, 1985 [DE] Fed. Rep. of Germany ....... 3515061

[51] Int. Cl.$^4$ .................... G01M 7/00; G01M 13/00
[52] U.S. Cl. .................... 364/508; 364/506; 364/550; 340/680; 340/683; 73/660; 73/579
[58] Field of Search .................... 364/506–508, 364/550, 566; 73/570, 579, 582, 649, 659, 660, 662; 340/679, 680, 683

[56] References Cited

U.S. PATENT DOCUMENTS

| | | | |
|---|---|---|---|
| 4,023,396 | 5/1977 | Yakshin et al. | 364/506 |
| 4,456,960 | 6/1984 | Wakai | 364/507 |
| 4,493,042 | 1/1985 | Shima et al. | 364/507 |
| 4,514,797 | 4/1985 | Begin | 364/507 |
| 4,520,674 | 6/1985 | Canada et al. | 364/508 |
| 4,614,117 | 9/1986 | Taniguti | 364/508 |

FOREIGN PATENT DOCUMENTS

| | | | |
|---|---|---|---|
| 0002232 | 11/1977 | European Pat. Off. | 364/507 |
| 2557428 | 7/1976 | Fed. Rep. of Germany. | |
| 3408492 | 11/1984 | Fed. Rep. of Germany. | |

*Primary Examiner*—Parshotam S. Lall
*Assistant Examiner*—Brian M. Mattson
*Attorney, Agent, or Firm*—Spencer & Frank

[57] ABSTRACT

To monitor machines for breakage and/or wear of the tool, the vibrations produced by dynamic forces generated by the machine parts are measured in the range of the natural frequency of the machine above the operating frequencies. The measured values are compared, as the desired states or conditions, with the respective momentary vibration behavior of these measuring locations and frequency ranges (i.e., the actual operating state or condition), and whenever there is a deviation of the actual state from the desired state by a given threshold value, a signal is emitted which may be used to shut down the machine.

13 Claims, 7 Drawing Sheets

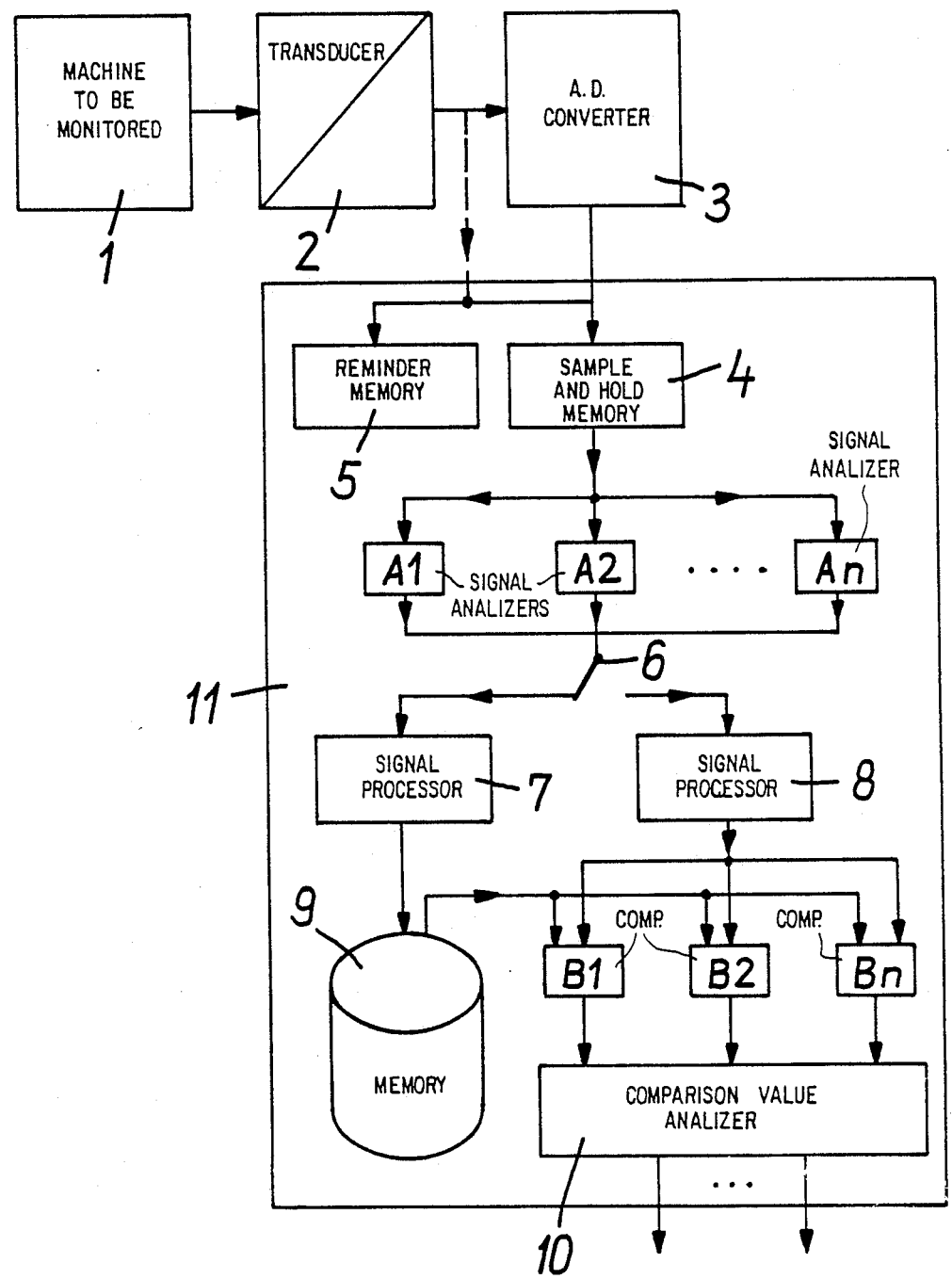

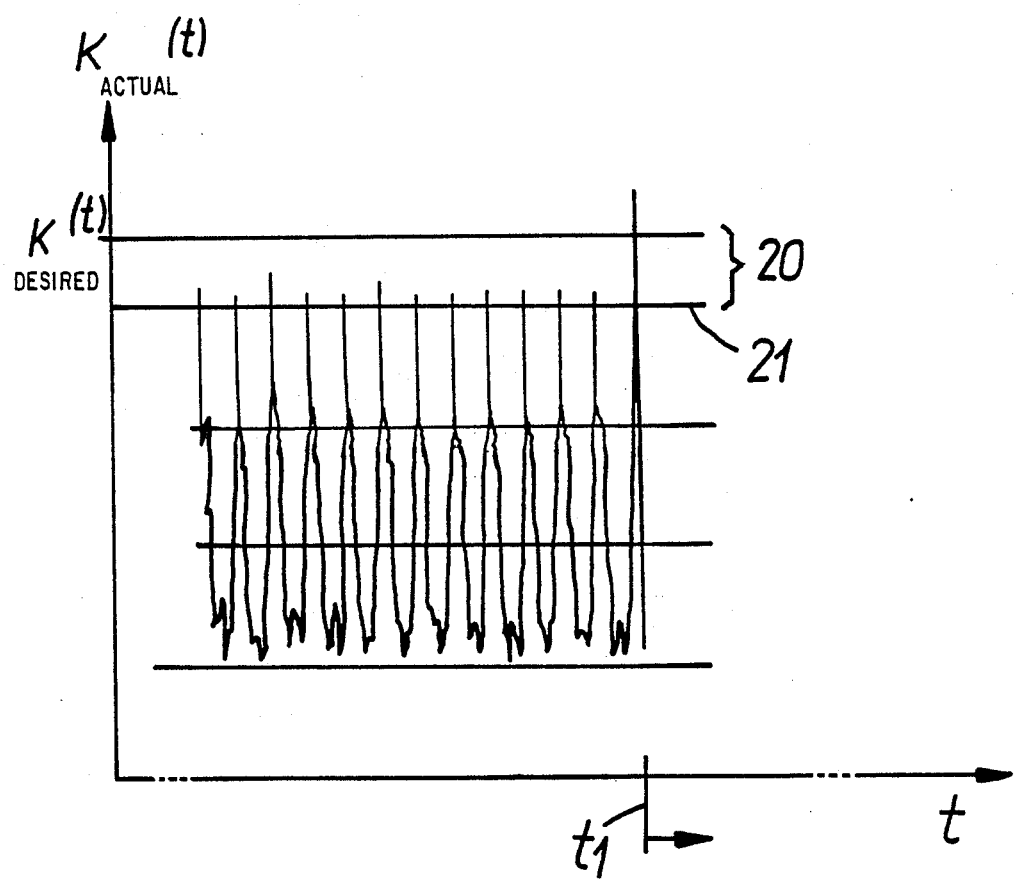

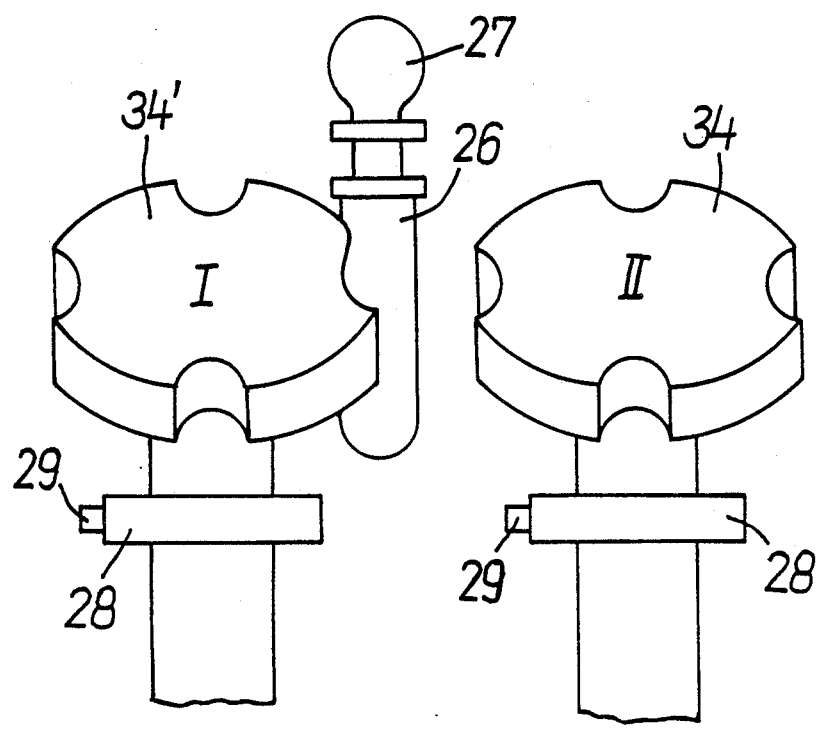

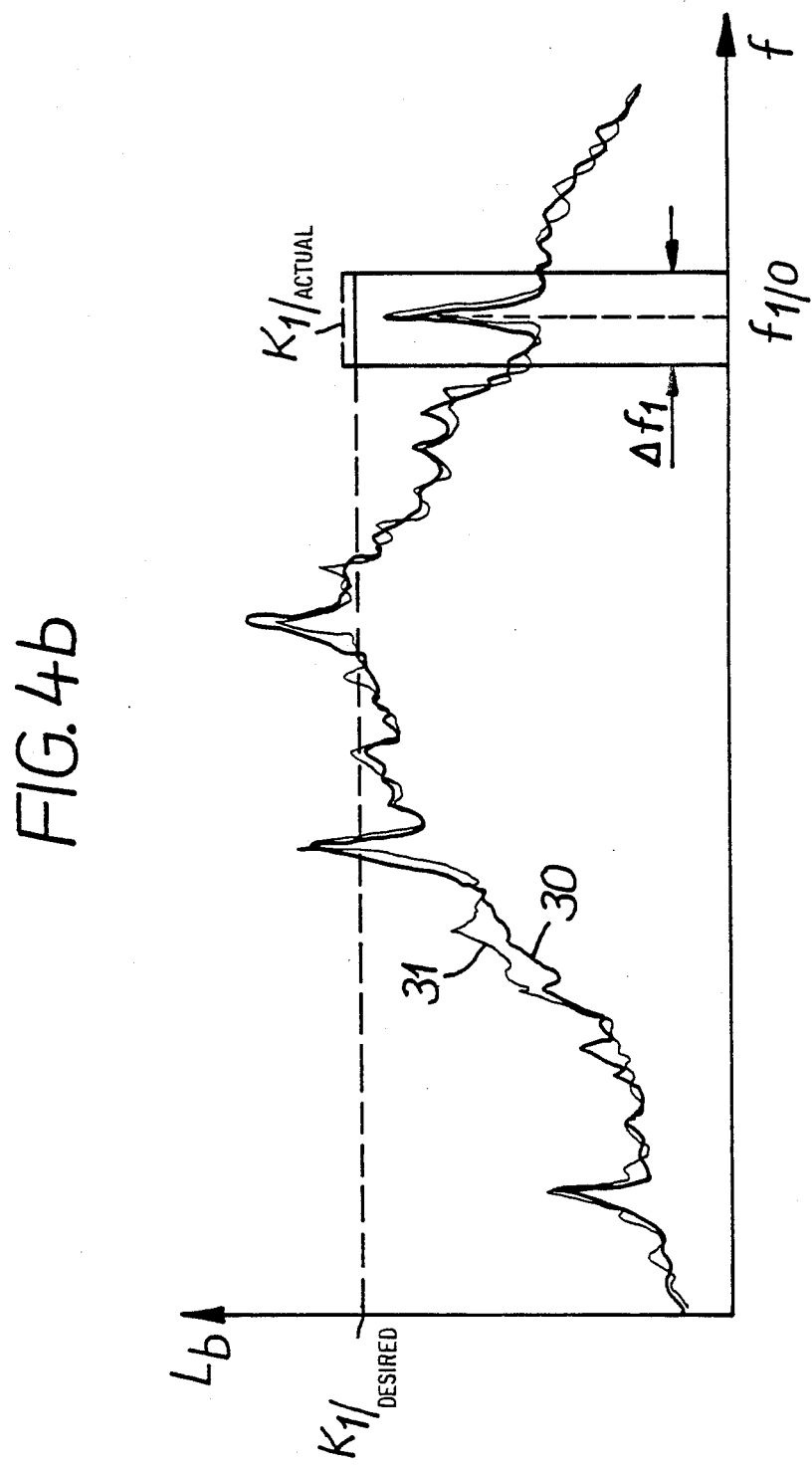

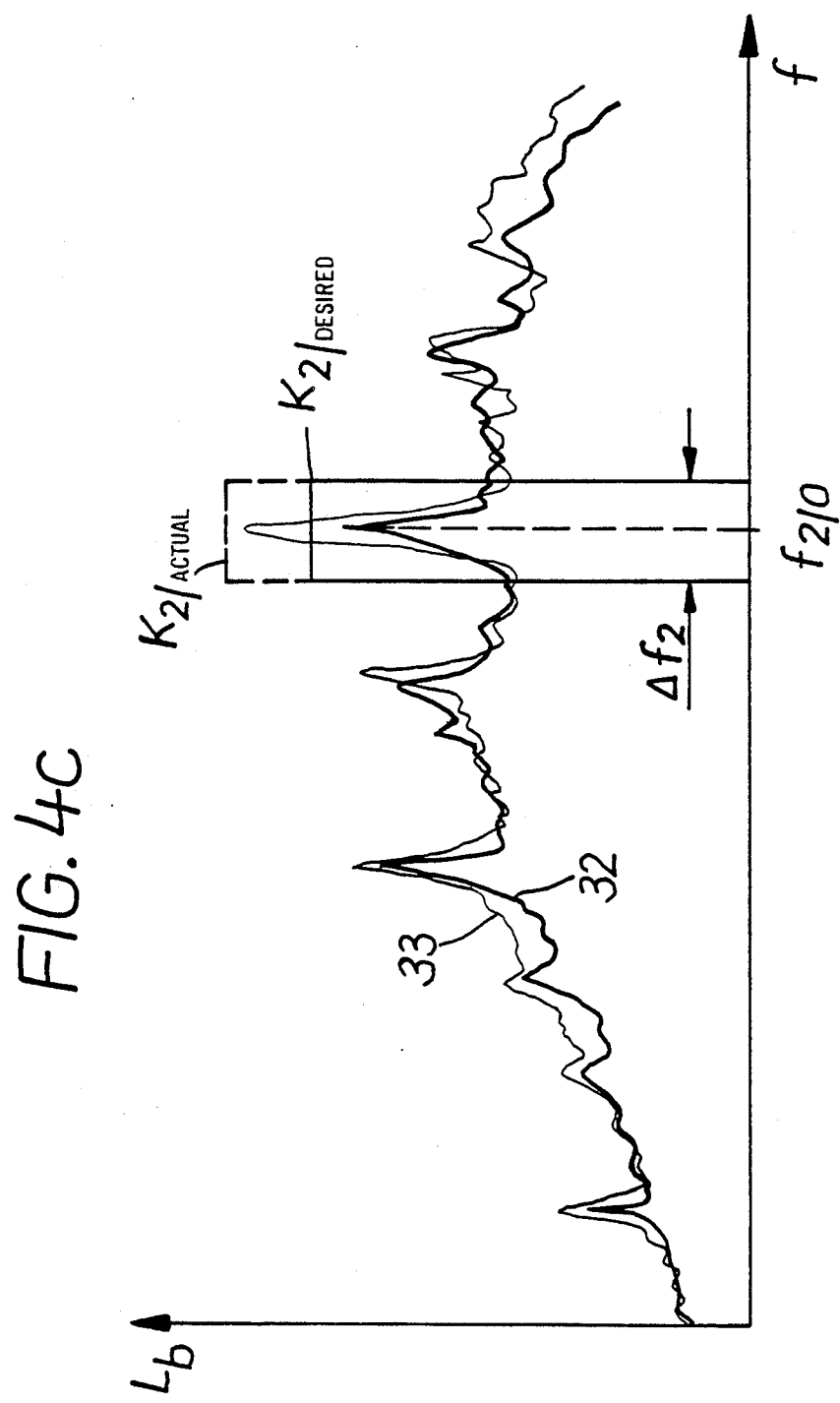

METHOD AND APPARATUS FOR MONITORING MACHINE PARTS

BACKGROUND OF THE INVENTION

The present invention relates to a method and apparatus for monitoring machine parts by measuring the occurring vibrations.

In order to be able to properly operate numerically controlled machines, it is necessary to monitor the machine as it is subject to wear and tear. A monitoring method and the apparatus suitable for this purpose for components of an automatically operating machine must thus be able to detect gradually and/or suddenly occurring changes in the machine state and must switch off the machine, for example, when there is the danger of breakage.

Federal Republic of Germany DE-OS No. 2,557,428, corresponding to U.S. Pat. No. 4,087,801, for example, discloses a device for determining damage at cutting tools in which a detector furnishes an electrical signal corresponding to the vibrations generated at the tool table or in the tool carrier during the cutting process. If, for example, the cutting tool is damaged, the detector produces a high amplitude output signal which is different from the previously furnished signal that was proportional to the acceleration of the mechanical vibration. As a result, the cutting tool is separated from the workpiece so that the anomalous vibration ceases and the detector output drops to a lower level. The drawback here is that the monitoring device reacts only if the damage has already occurred so that considerable damage may occur at the tools or workpieces.

Federal Republic of Germany DE-OS No. 3,408,492 discloses a noise measuring device for measuring anomalous noise in drive mechanisms. By means of a microphone, the device records the noise generated by the drive mechanism being examined, and an adjustable bandpass filter connected to the microphone automatically filters out all components of the microphone output signal except those which have a desired frequency that is a function of the velocity or rpm of the drive mechanism being examined. The data recorded graphically by an X-Y plotter must be evaluated to determine the quality of the drive mechanism being examined. This device thus permits only precautionary tests of drive mechanisms. Since the anomalous noises are a sequence of vibrations emitted previously by the machine, this method is also insensitive.

The other known machine monitoring systems employing the measurement of vibrations are likewise essentially limited to monitoring bearings and are designed for the operating frequencies of the machine, such as, for example, bearing frequency, number of revolutions, and gear engagement frequencies. Depending on the configuration and dynamic behavior of the machine, it is impossible to detect slight changes at operational components of a machine. Moreover, the prior art methods and devices do not permit differentiation between interfering influences emanating from the machine itself or those from extraneous interference. In any case, the often thus falsified measuring results are insufficient to assure a sufficiently sensitive monitoring process.

SUMMARY OF THE INVENTION

It is an object of the present invention to monitor machines and the components of an automatically operating machine required for its proper operation. In particular, a method and an apparatus are to be provided, according to the present invention, for monitoring machines so that breakage or wear of the tool, to the extent that such would endanger the further manufacturing process, can be detected while such breakage or wear develops, and the machine can be shut down before the actual damage occurs.

This is accomplished by the present invention in that initially the natural or characteristic vibrational behavior above the operating frequencies of the machine with respect to the dynamic forces generated by the components to be monitored is determined. For this purpose, suitable measuring locations are determined on the machine structure or directly on the tool which is endangered by breakage or wear and, in special cases also on the workpiece.

Then, the vibrations for defined operating states, e.g., the acceleration, of the machine are measured in the frequency range of the previously determined natural vibrations above the operating frequencies, and from this evaluation criteria are determined in modules suitable for monitoring the machine, such criteria being stored as the so-called desired state which is compared with the momentary vibration behavior of the same measuring locations and frequency ranges, i.e., the actual state. If the actual state and the desired state deviate from one another by a given threshold value, the machine is shut down or a signal is emitted. Advantageously, the process operates continuously and permits early detection of impending damage.

Preferably, the desired and the actual state are determined by measuring the acceleration of the measuring locations, i.e. the acceleration of vibrations, and the measured values are converted to analog or digital electrical signals. This enables microcomputers to be used.

A microcomputer with exchangeable modules is well suited for processing and storing the desired state and for considering, in the determination of this desired state, extraneous interfering influences which do not originate from the operational sequence of the machine.

Preferably the actual states are also stored so as to make it possible to later accurately analyze the cause of the occurrence of interferences or disturbances which lead to the shut-down of the process sequence, and to possibly broaden the catalog of permissible interferences, i.e. extraneous forces. The desired state is thus constantly revised and supplemented by the addition of up-to-date information.

A monitoring unit suitable for implementing this method is composed of the following components which are connected in series: a signal transducer which converts the measured physical parameters, e.g. acceleration values, into analog electrical values; a memory for the desired states and/or the actual states; a frequency analyzer, preferably coupled with a bandpass filter, and/or a peak value analyzer, a comparator for comparing the actual states and the desired states; and a comparison value analyzer (discriminator) which emits a signal if a fixed, given threshold value is exceeded, with such a signal possibly being used to shut down the machine.

According to a further feature of the invention, the device also includes an additional reminder memory for the actual states. Various interchangeable software modules permit optimum utilization of the microcomputer, with each module being adapted to a special case of use and containing specific, informational evaluation criteria, e.g. threshold values. These evaluation criteria are stored as desired values for certain, preselectable time periods and frequency sections and can be brought up to date at any time, if desired. During the continuous monitoring according to the invention, the momentary evaluation criteria, i.e., essentially the actual states, are determined and are compared with the stored desired values or desired states, which is advantageously done in special modules adapted to the problem. The permissible disturbing influences are here considered automatically and eliminated as necessary. In this way it is possible to derive monitoring criteria which are free of any interferences.

The advantages that can be realized with the present invention are, in particular, that changes occurring in the range of the value being monitored can be detected with greater sensitivity on the basis of the natural frequencies above the operating frequencies of machine structures. Moreover, it is possible to sharply differentiate those vibrations which are an indication of greater machine wear or the like. By storing the previously determined catalog of permitted interference values and eliminating or filtering out these permitted interference values during a comparison between desired values and actual values, the reliability of the monitoring method can be increased substantially. With the aid of the provided reminder memory, e.g. a ring memory, it is made possible to perform a cause analysis upon the occurrence of certain undesirable machine states, e.g. crash states, and broaden the catalog of permitted interference, if necessary, i.e. make the monitoring system able to learn. Thus, the monitoring system operates more reliably the longer it is in use and offers constant improvement of the monitoring criteria. Additionally it is also possible to include in the (stored) desired state other vibrations caused by extraneous influences which are tolerable within the monitoring process.

BRIEF DESCRIPTION OF THE DRAWINGS

FIG. 1 is a schematic circuit diagram of the apparatus according to the invention.

FIGS. 2b and 2c show the recorded acceleration of vibrations in the machine, with FIG. 2b showing the desired state and FIG. 2c showing the actual state.

FIG. 3 shows the vibration velocity level in dependence on the frequency in an automatic cutter according to FIG. 2a.

FIG. 4a is a schematic representation of two transfer stations in a blow molding machine.

FIGS. 4b and 4c are diagrams in which the acceleration level is plotted as a function of frequency for selected measuring locations in the transfer stations of FIG. 4a.

DETAILED DESCRIPTION OF THE PREFERRED EMBODIMENTS

Figure 2A:
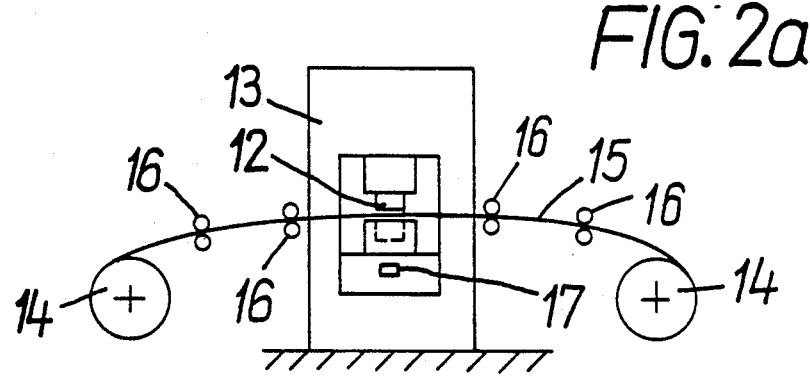
FIG. 2a is a schematic representation of an automatic cutter equipped with a monitoring device.

Referring now to FIG. 1, there is shown a machine 1 whose vibrations are to be monitored. The vibrations, as physical parameters of the unit of machine 1 to be monitored, are initially detected by a signal transducer 2, e.g., a pickup for sound traveling through a solid body, for defined operating states and later for momentary vibrations during operation. In the transducer 2, the measured physical value, e.g. the acceleration, is converted to an analog electrical value. If necessary, e.g., if further signal processing is to take place in a digital computer, the analog electrical value produced by transducer 2 is converted to a digital signal in a signal converter 3, i.e., an A/D converter. As required, the electrical signals are fed by signal transducer 2 or signal converter 3 to a sample and hold memory 4. If desired, the detected or measured vibration signals may also be fed into a reminder memory 5.

For an evaluation of evaluation criteria, such as, for example, peak values, frequency analyses, etc., a plurality of modules $A_1$ to $A_n$ having their inputs connected to the output of memory 4 are provided. Depending on the specific signal criteria to be evaluated, the modules $A_1$–$A_n$, for example, may each contain a frequency analyzer (preferably coupled with a band pass filter), and/or a peak value analyzer and/or a statistical analyzer and/or an analyzer for the transmission of forces and/or vibrations both near the working place and at measuring points at a greater distance. Advisably, the modules $A_1$–$A_n$ are removeable and exchangeable. The outputs of these modules $A_i$ are connected, via a switch 6, with signal processing units 7 and 8 for the desired state and the actual state, respectively, in which, for example, the acceleration level for a certain bandwidth in the range of the natural frequency of the machine structure is determined. The output of processing unit 7 is connected to a further memory unit 9 from which the stored problem specific desired state, including permissible interfering influences, can be obtained for subsequent comparison with the measured momentary or actual values. For this purpose, modules $B_1$ to $B_n$ are provided which are essentially configured as comparators and compare the desired state, as supplied by memory 9, with the actual state, as supplied by processor 8, each time in actualized or real time form. The outputs of these modules $B_i$ are connected with a comparison value analyzer 10 which combines the comparison criteria and evaluates them as programmed. In the simplest case, a discriminator would serve as the comparison value analyzer 10 and would emit a signal when a fixed, given threshold value is exceeded. It is conceivable to combine all of the evaluation units 4 to 10 as well as modules $A_i$ and $B_i$ in a microcomputer 11.

FIG. 2 is a simplified illustration of a system for monitoring for breakage of the tool 12 of an automatic punching machine 13. The punching tool 12 punches holes at given intervals into a foil 15 wound onto and unwound from reels 14. Guide rollers 16 for foil 15 are shown for the sake of completeness. At a preselected location on the automatic punching machine, in the present case below the working plane, a measuring value or vibration sensor 17 is attached.

With the system described in connection with FIG. 1 the automatic punching machine is monitored as follows: in a module $A_1$ according to FIG. 1, the amplitude of the vibration acceleration level $L_b$ picked up by measuring value sensor 17 for a certain frequency band in the range of the natural frequency above the operating frequencies of the machine structure is determined as a function of time t for a specific point on the structure. This results in an evaluation criterion in that, in the processor 7, a statistical peak value is calculated from, for example, 100 operating advances and an allowable tolerance value for breakage is added to the calculated peak value. This criterion is then stored in the memory 9 as the desired value for the time period $K_{des}(t)$. FIG. 2b shows the acceleration level $L_b$ in the form of measured values $K_{des}(t)$. The curve 18 obtained this way clearly shows the peak values 19 encountered during cutting which, in the normal state, lie within a permissible tolerance range 20 which constitutes the deviation about a statistically determined peak value.

During continuous monitoring, the peak values of the individual operating advances $K_{actual}(t)$ for this time period are likewise determined in module $A_1$ for the same frequency band and are compared in module $B_1$ with the stored desired value. If the desired values are exceeded, the machine is shut down before the next operating advance. Such a shutdown process can be seen in FIG. 2c. There those $K_{actual}(t)$ values are plotted over time which lie above the statistical peak value 21, but within tolerance limits 20, until tool 12 breaks and a $K_{actual}(t)$ value results at time $t_1$ which lies outside the tolerance limits 20. Immediately after this range is exceeded, the machine is shut down at time $t_1$, before punching tool 12 performs its next stroke.

Figure 2B:
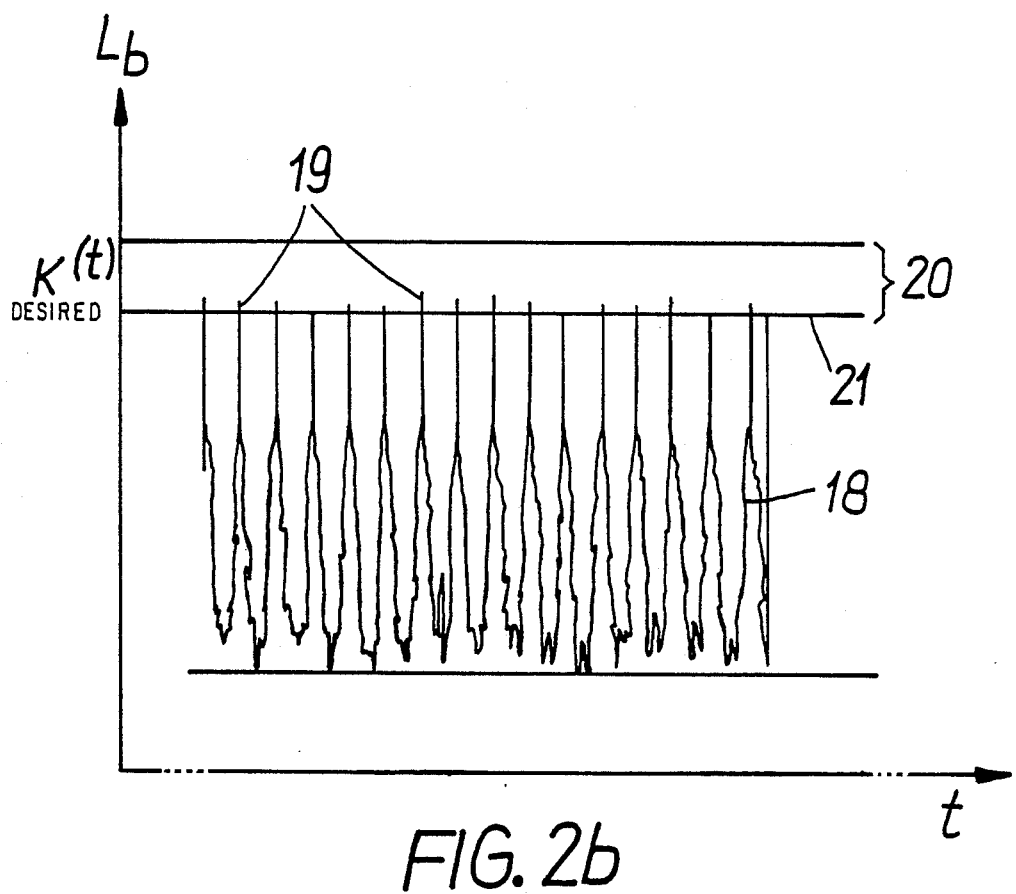

The above-described method can also be used to monitor the wear of a tool in the punching machine shown in FIG. 2a. For this purpose, a module $A_2$ is employed in which the amplitude of the vibration velocity level $L_v$ of measuring value sensor 17 is determined as a function of frequency f, and from this value an evaluation criterion is determined for the frequency range. From the averaged frequency spectra obtained, for example, from about 20 measurements, the effective values of certain bandwidths in the range $\Delta f_1$ of the stroke or operating frequency (indicated by $f_B$ in FIG. 3) and in the range $\Delta f_2$ of the natural frequency (indicated by $f_0$ in FIG. 3) of the system are determined. As was done in connection with the previous description of FIG. 2 for peak value monitoring, the respective desired value for the wear criteria $K_{desired}(\Delta f_1)$ and $K_{desired}(\Delta f_2)$ are likewise determined, namely by integration to form the statistical averages, i.e., the effective values, in the processor 7.

If it is known, e.g., from an interference level analysis of the machine, that the occurrence of an extraneous interfering influence, e.g., an influence or vibration produced by the start-up of a press disposed in the vicinity of the machine being monitored, causes an increase in the measured signals to the extent that reliable monitoring would normally be impossible, the effective value of the measured signals upon the occurrence of the extraneous interference is determined for a certain frequency range $\Delta f_3$ (FIG. 3) which is determinative for the interference, and this value is stored as a criterion for the permissible interference $K_{interf.}(\Delta f_3)$.

For continuous monitoring, the momentary effective values $K_{actual}$ are determined for the stated frequency range $\Delta f_3$. In Module $B_2$, there is initially formed the difference $$\Delta_{interf.} = K_{interf.}(\Delta f_3) - K_{actual}(\Delta f_3).$$

As long as $\Delta_{interf.}$ is less than the permissible deviation, the momentary effective values $K_{actual}$ for the ranges $\Delta f_1$ and $\Delta f_2$ are not considered for wear monitoring. A reliable limit value is considered to be a value at which the measured signals can just yet be evaluated. If $\Delta_{interf.}$ exceeds the permissible limit value, an averaged frequency spectrum is formed of a plurality of, e.g. 20, momentary frequency spectra and the effective values $K_{actual}(\Delta f_1)$ and $K_{actual}(\Delta f_2)$ are determined from it. During the subsequent comparison of the desired value and the actual value for wear monitoring in module $B_2$, the following differences are formed:

$$\Delta_1 = K_{actual}(\Delta f_1) - K_{desired}(\Delta f_1)$$

$$\Delta_2 = K_{actual}(\Delta f_2) - K_{desired}(\Delta f_2)$$

From this, the following evaluation criteria are derived in the comparison value analyzer 10:

1. For $\Delta_1 > L_1$ and $\Delta_2 > L_2$, a signalling sign, such as, for example, a horn or a blinker, is energized to alarm an operator. $L_1$ and $L_2$ are selectable limit levels (in dB) for permissible wear.
2. For $\Delta_1 > L_3$ and $\Delta_2 > L_4$, the machine is shut down. $L_3$ and $L_4$ are limit levels for critical wear.

Figure 3:
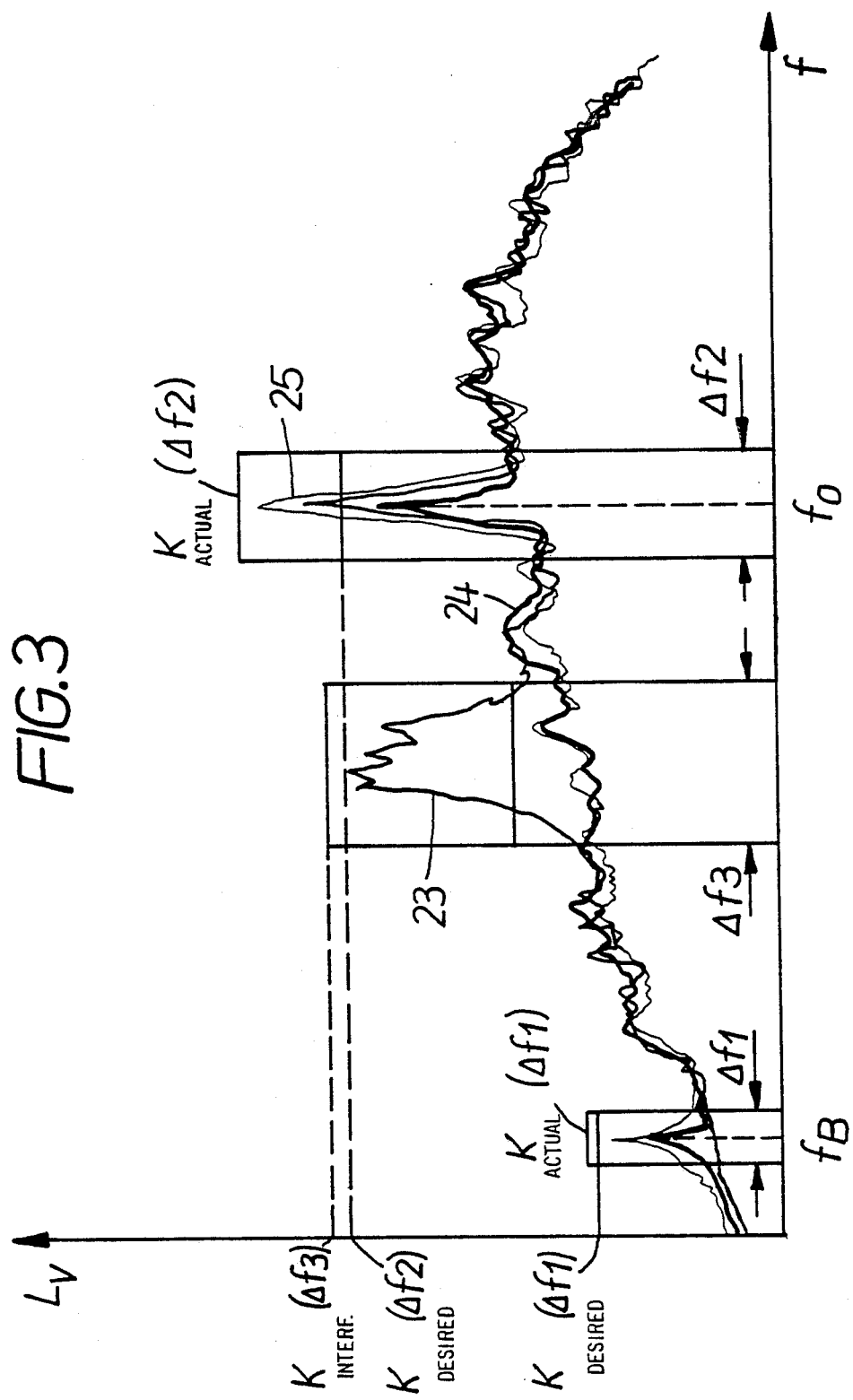

Levels $L_1$ and $L_3$ depend on the number of strokes. Input operating data, which may also be done automatically, sets the corresponding values for $\Delta f_1$, $L_1$ and $L_3$. FIG. 3 shows, in a schematic representation, the vibration velocity level of the (extraneous) or external interference signal 23, of the desired signal 24 and of the actual signal 25 as well as the frequency ranges $\Delta f_1$ for the operating frequencies; $\Delta f_3$ for the interference frequencies and $\Delta f_2$ for the natural frequency range according to the invention. FIG. 3 particularly shows the high sensitivity to wear, according to the measuring method of the invention in the natural frequency range $\Delta f_2$, and that this range reacts significantly more sensitively to wear than the operating frequency range $\Delta f_1$. Thus, the natural frequency range $\Delta f_2$ is surprisingly significantly better suited for machine monitoring.

In a further example of use of the invention, the operating state of a blow molding machine is monitored by measuring the vibrations in the range of the natural frequencies of the machine structure. With this monitoring, it is possible to detect interferences early and to shut down the system before the crash state occurs.

FIG. 4a is a schematic representation of only two of the four transfer stations, i.e. stations I and II, of the blow molding machine in whose region most of the interferences occur. These sources of interference are based primarily on the faulty transfer of mandrels 26 and preforms 27. The acceleration is measured with the aid of respective acceleration sensors 29 for the respective bearings 28 of the transfer stations. In a module $A_3$ according to the arrangement described in connection with FIG. 1, effective values of a certain bandwidth, in the range of the natural frequency of the structure, are determined from about 50 average calculations made for all measuring positions on the machine in its new state and these are stored as desired criteria, $K_{1/desired}$ to $K_{4/desired}$, i.e., one for each transfer station.

FIGS. 4b and 4c show the desired states 30 and 32, respectively, and the actual states 31 and 33, respectively, plotted in each case over the frequency f, for the transfer station I and II. During continuous monitoring, the actual criteria $K_{1/actual}$ to $K_{4/actual}$ for the four transfer stations are determined in module $A_3$ and processor 8 from about 20 average calculations for the same frequency ranges as used in the determination of the desired values. The differences $$\Delta_1 = K_{1/actual} - K_{1/desired}$$

$$\Delta_2 = K_{2/actual} - K_{2/desired}$$

$$\Delta_3 = K_{3/actual} - K_{3/desired}$$

$$\Delta_4 = K_{4/actual} - K_{4/desired}$$

are then calculated in module B₃. By comparing these difference levels with the associated permissible limit values in comparison value analyzer 10 (FIG. 1), each operating state of the transfer station is monitored individually and, if necessary, the machine is shut down before a crash state occurs, or an alarm signal is generated.

In the present example of use, the difference $$\Delta_2 = K_{2/actual} - K_{2/desired}$$

is greater than the permissible limit value as indicated in FIG. 4C. The reason for this is that turntable 34, see FIG. 4a, of the second transfer station II has rotated with respect to turntable 34' of the first transfer station I to such an extend that a centered transfer of mandrels 26 from transfer station I to II is impossible. By measuring the vibration acceleration in the bearing 28 of the transfer station II, in the range of the natural frequencies of transfer station II, this error can be detected and localized. This makes it possible to shut the machine down before the crash state occurs.

A further example of use is the monitoring for breakage and wear of the cutting tool of an automatic lathe. In this case, the natural frequencies of the machine structure are initially determined at suitable measuring locations as a function of the forces to be monitored, e.g. the cutting or feeding forces. For continuous wear monitoring, the vibrations of the machine structure are measured at the same locations as above and, similarly to the example illustrated in FIG. 4, desired values $K_i$ are determined in the frequency range of the natural frequency range of the machine structure. From a comparison with the associated actual values, evaluation criteria are then derived for the wear of the cutting tool.

The monitoring of breakage of the cutting tool, similarly to the example illustrated in FIG. 2, is performed as a function of time so as to shut down the machine in the shortest possible time, i.e. within one revolution of the workpiece, whenever the actual state exceeds a previously determined desired state. To make this possible, the actual value is continuously determined in real time for an average period of time which is shorter than the duration of one revolution of the workpiece.

The permissible interferences in this machine may be determined, inter alia with the aid of the reminder memory 5, depending on the location of use of the machine and the interferences encountered there. This can be considered during the monitoring process and the catalog of permissible interferences can be expanded accordingly. More specifically, since the detected actual state signals are stored in the reminder memory 5, in the case of a disturbance in which the monitoring system has not correctly responded, for example a break was not recognized, an additional analysis can be made of the cause of this disturbance from the date in the reminder memory 5. From this additional analysis the catalog of allowed disturbance and/or the evaluation criteria can be expanded or enlarged.

It will be understood that the above description of the present invention is susceptible to various modifications, changes and adaptations, and the same are intended to be comprehended within the meaning and range of equivalents of the appended claims.

What is claimed is:

1. A method for monitoring machine parts by measuring occurring vibrations, comprising the steps of: selecting suitable measuring locations on a machine or on a tool itself which is endangered by breakage or wear; selecting relevant frequency ranges, above machine operating frequencies, of machine natural frequencies to be expected as a function of operating forces for the selected measuring locations; measuring the vibrations in the frequency range of the selected natural frequencies at the selected measuring locations of the machine to determine a so-called desired state; storing measured values corresponding to said desired state; and thereafter, measuring momentary vibration values of the same said measuring locations and frequency ranges during continuous operation of the machine to determine a so-called actual state, comparing the stored values corresponding to said desired state with the momentary values corresponding to said actual state, and emitting an output signal if there is a deviation of said actual state value from said desired state value by a given threshold value.

2. A method as defined in claim 1 further comprising using said output signal to shut down the machine.

3. A method as defined in claim 1, wherein said desired state and said actual state are determined by measuring physical vibrations of the measuring locations and converting these physical vibrations to analog or digital electrical signals.

4. A method as defined in claim 3 wherein acceleration of the physical vibrations is measured.

5. A method as defined in claim 3 wherein the desired state is processed in exchangeable modules for certain monitoring tasks and subsequently stored.

6. A method as defined in claim 3 wherein said steps of measuring include processing the electrical signals in exchangeable modules, each configured for carrying out a defined monitoring task.

7. A method as defined in claim 1 further comprising, monitoring an interference frequency range above the operating frequencies, which interference frequency range is stimulated by repeatedly occuring extraneous forces which are not caused by the machine being monitored but have an influence on the vibrations of the machine, and considering detected frequencies in said interference frequency range in the determination of the desired state.

8. A method as defined in claim 1 further comprising storing the measured values corresponding to said actual states.

9. A method as defined in claim 1 further comprising correcting the desired state and the threshold value by values of the actual state at which an undesired machine state caused by extraneous influences has been detected.

10. An apparatus for monitoring machine parts for wear by measuring vibrations occurring in a machine comprising: a signal transducer which detects vibrations and which converts the detected vibration signals into analog electrical values; a sample and hold memory connected to an output of said transducer; means, connected to an output of said sample and hold memory, for analyzing output signals from said transducer according to evaluation criteria; a comparator means, having one input connected to an output of said means for analyzing, for comparing actual state signals provided by said means for analyzing with stored desired state signals; a comparison value analyzer which emits a signal whenever a fixed, given threshold value is exceeded by an output signal of said comparator; a further memory for storing said desired state signals and having its output connected to the other input of said comparator means; and an additional reminder memory, having an input connected to the output of said transducer, for storing the actual state signals for enlarging the evaluation criteria; and wherein said means for analyzing includes respective frequency analyzers and peak value analyzers whose inputs are connected to the output of said sample and hold memory, and said comparison value analyzer and said frequency analyzers and said peak value analyzers are provided in exchangeable module form.

11. An apparatus as defined in claim 10 wherein said frequency analyzers are coupled with respective band pass filters.

12. An apparatus as defined in claim 10 further comprising a first signal processing module for desired state signals having its output connected to an input of said further memory; and wherein said means for analyzing includes a second signal processing module for the actual state signals whose output is said output of said means for analyzing, and a switch means for selectively connecting outputs of said frequency and peak value analyzers to inputs of said first or second signal processing modules.

13. An apparatus as defined in claim 10 wherein said frequency analyzers and said peak value analyzers in module form are interchangeable.

* * * * *